(12) United States Patent
Wood, Sr. et al.

(10) Patent No.: US 12,040,654 B2
(45) Date of Patent: Jul. 16, 2024

(54) ON-BOARD STARTING MODULE FOR VEHICLE ENGINE

(71) Applicant: Systematic Power Manufacturing, LLC, Knoxville, TN (US)

(72) Inventors: Robert J. Wood, Sr., Naples, FL (US); Chad E. Hall, Walton, NY (US); Bryce Gregory, Port Crane, NY (US); Luke Yetto, Walton, NY (US); Daniel A. Patsos, Canajoharie, NY (US); Joseph Agrelo, Ballston Spa, NY (US)

(73) Assignee: Systematic Power Manufacturing, LLC, Knoxville, TN (US)

( * ) Notice: Subject to any disclaimer, the term of this patent is extended or adjusted under 35 U.S.C. 154(b) by 0 days.

(21) Appl. No.: 17/821,687

(22) Filed: Aug. 23, 2022

(65) Prior Publication Data

US 2022/0407343 A1 Dec. 22, 2022

Related U.S. Application Data

(63) Continuation-in-part of application No. 17/832,619, filed on Jun. 4, 2022, which is a continuation-in-part
(Continued)

(51) Int. Cl.
*H02J 7/14* (2006.01)
*F02N 11/08* (2006.01)
(Continued)

(52) U.S. Cl.
CPC ............ *H02J 7/14* (2013.01); *F02N 11/0862* (2013.01); *F02N 11/087* (2013.01);
(Continued)

(58) Field of Classification Search
CPC .......... H02J 7/14; H02J 7/0042; H02J 7/0047; H02J 7/345; F02N 11/0862;
(Continued)

(56) References Cited

U.S. PATENT DOCUMENTS 5,710,699 A 1/1998 King et al.
6,476,586 B2 11/2002 Yunosawa et al.
(Continued)

FOREIGN PATENT DOCUMENTS

CN 205178537 U 4/2016
CN 106100091 A 11/2016

OTHER PUBLICATIONS

Translation of CN 205178537 U; Published Apr. 20, 2016; 7 pages.
(Continued)

*Primary Examiner* — Syed O Hasan
(74) *Attorney, Agent, or Firm* — Peter L. Brewer; Thrive IP

(57) ABSTRACT

A starting module for a vehicle is provided. The starting module is configured to reside on-board the vehicle, and is used to start an engine associated with the vehicle in the event the battery on the vehicle is too weak to crank the engine. The engine starting module first comprises a housing. The housing resides proximate the vehicle battery and holds a plurality of super capacitors. The super capacitors reside within the housing, are configured in series, and are electrically in parallel with the vehicle battery. The super capacitors store charge received from the electrical system of the vehicle. The starting module also includes control logic. The control logic controls the discharge of stored energy from the super capacitors. The engine starting module also comprises an isolation switch, configured to move between open and close positions in response to signals from the control logic in order to restore charge to the battery as needed.

18 Claims, 11 Drawing Sheets

Related U.S. Application Data of application No. 17/379,473, filed on Jul. 19, 2021, now Pat. No. 11,479,080, which is a continuation-in-part of application No. 16/352,555, filed on Mar. 13, 2019, now Pat. No. 11,069,488.

(60) Provisional application No. 63/300,687, filed on Jan. 19, 2022, provisional application No. 63/209,887, filed on Jun. 11, 2021.

(51) Int. Cl.
*H02J 7/00* (2006.01)
*H02J 7/34* (2006.01)

(52) U.S. Cl.
CPC .......... *H02J 7/0042* (2013.01); *H02J 7/0047* (2013.01); *H02J 7/345* (2013.01); *F02N 2011/0874* (2013.01); *F02N 2011/0885* (2013.01); *F02N 2200/063* (2013.01)

(58) Field of Classification Search
CPC .............. F02N 11/0866; F02N 11/087; F02N 2011/0874; F02N 2011/0885; F02N 2011/0888; F02N 2200/061; F02N 2200/063
See application file for complete search history.

(56) References Cited

U.S. PATENT DOCUMENTS

| | | |
|---|---|---|
| 6,518,733 B1 | 2/2003 | Schenkel et al. |
| 6,765,312 B1 | 7/2004 | Urlass et al. |
| 6,799,070 B2 | 9/2004 | Wolfe et al. |
| 7,077,209 B2 | 7/2006 | McCulloch et al. |
| 7,119,518 B1 | 10/2006 | Dougherty et al. |
| 7,193,390 B2 | 3/2007 | Nagai et al. |
| 7,362,005 B2 | 4/2008 | Leblanc |
| 7,548,409 B2 | 6/2009 | Kojima et al. |
| 7,628,028 B2 | 12/2009 | Tolbert, Jr. et al. |
| 7,633,271 B2 | 12/2009 | Schulte et al. |
| 7,667,432 B2 | 2/2010 | West et al. |
| 7,782,016 B2 | 8/2010 | Kang et al. |
| 7,887,943 B2 | 2/2011 | Yoshikane et al. |
| 7,944,080 B2 | 5/2011 | Ishizeki |
| 7,946,123 B2 | 5/2011 | Tolbert, Jr. et al. |
| 8,264,333 B2 | 9/2012 | Blaker et al. |
| 8,305,733 B2 | 11/2012 | Chan et al. |
| 8,314,578 B2 | 11/2012 | Namuduri et al. |
| 8,379,367 B2 | 2/2013 | Oh et al. |
| 8,519,821 B2 | 8/2013 | Ablabutyan |
| 8,655,574 B2 | 2/2014 | Izumoto et al. |
| 8,751,116 B2 | 6/2014 | Bark et al. |
| 8,792,224 B2 | 7/2014 | Kim et al. |
| 8,798,871 B2 | 8/2014 | Lugash et al. |
| 8,860,244 B2 | 10/2014 | Hattori |
| 8,886,425 B2 | 11/2014 | Doering et al. |
| 9,272,627 B2 | 3/2016 | Miller |
| 9,300,018 B2 | 3/2016 | Watson et al. |
| 9,415,690 B2 | 8/2016 | Nieto et al. |
| 9,562,715 B2 | 2/2017 | Kandasamy |
| 9,616,796 B2 | 4/2017 | Russo et al. |
| 9,627,908 B2 | 4/2017 | Kaminsky et al. |
| 9,666,860 B2 | 5/2017 | Lam et al. |
| D792,847 S | 7/2017 | Stone et al. |
| 9,803,609 B2 | 10/2017 | Setterberg et al. |
| 9,833,223 B2 | 12/2017 | Wood et al. |
| 9,892,868 B2 | 2/2018 | Pyzza et al. |
| 9,899,643 B2 | 2/2018 | Pyzza et al. |
| 9,911,541 B2 | 3/2018 | Wang et al. |
| 9,991,060 B2 | 6/2018 | Bouchard et al. |
| 10,000,125 B2 | 6/2018 | Choi |
| 10,023,065 B2 | 7/2018 | Huang et al. |
| 10,024,408 B2 | 7/2018 | Johnson |
| 10,029,572 B2 | 7/2018 | Sakatani et al. |
| 10,065,523 B2 | 9/2018 | Wood et al. |
| 10,119,514 B2 | 11/2018 | Averbukh et al. |
| 10,153,096 B2 | 12/2018 | Xi et al. |
| 10,158,152 B2 | 12/2018 | Watson et al. |
| D840,340 S | 2/2019 | Suszko et al. |
| 10,240,847 B1 | 3/2019 | Stone et al. |
| 10,242,808 B2 | 3/2019 | Eilertsen et al. |
| 10,278,681 B2 | 5/2019 | Wood et al. |
| 10,297,572 B2 | 5/2019 | Dalal et al. |
| 10,297,885 B2 | 5/2019 | Gayden et al. |
| 10,319,536 B1 | 6/2019 | Achrekar |
| 10,523,019 B2 | 12/2019 | Rohera |
| 10,551,104 B2 | 2/2020 | Kandasamy |
| 10,596,913 B2 | 5/2020 | Healy et al. |
| 10,654,369 B2 | 5/2020 | Healy |
| 10,668,825 B2 | 6/2020 | Wood et al. |
| 10,668,831 B2 | 6/2020 | Hudson |
| 10,710,525 B2 | 7/2020 | Pierce et al. |
| 10,723,182 B2 | 7/2020 | Lesesky et al. |
| 10,744,888 B2 | 8/2020 | Healy et al. |
| 10,821,853 B2 | 11/2020 | Healy et al. |
| 10,967,742 B2 | 4/2021 | Healy |
| 10,981,487 B1 | 4/2021 | Russo |
| 11,046,192 B2 | 6/2021 | Aufdencamp |
| 11,069,488 B2 | 7/2021 | Johnson et al. |
| 11,165,266 B2 | 11/2021 | Johnson et al. |
| 11,273,716 B2 | 3/2022 | Matsuda et al. |
| 11,281,982 B2 | 3/2022 | Cristache |
| 11,293,394 B2 | 4/2022 | Banerjee et al. |
| 11,303,139 B2 | 4/2022 | Hinterberger et al. |
| 11,303,980 B2 | 4/2022 | Chng et al. |
| 2003/0151875 A1 | 8/2003 | Nguyen et al. |
| 2006/0005739 A1 | 1/2006 | Kumar |
| 2007/0047100 A1 | 3/2007 | Takahashi et al. |
| 2007/0132313 A1 | 6/2007 | Baeuerle |
| 2008/0268330 A1 | 10/2008 | Hansen et al. |
| 2009/0091291 A1 | 4/2009 | Woody et al. |
| 2009/0133419 A1 | 5/2009 | Matsuno et al. |
| 2009/0266091 A1 | 10/2009 | Tolbert, Jr. |
| 2009/0314561 A1 | 12/2009 | Handa |
| 2010/0079109 A1 | 4/2010 | Eilertsen et al. |
| 2010/0148582 A1 | 6/2010 | Carter |
| 2010/0275628 A1 | 11/2010 | Moseley |
| 2011/0030414 A1 | 2/2011 | Newell et al. |
| 2011/0218698 A1 | 9/2011 | Bissontz |
| 2011/0288738 A1 | 11/2011 | Donnelly et al. |
| 2012/0049638 A1 | 3/2012 | Dorn et al. |
| 2012/0235473 A1 | 9/2012 | Jiang et al. |
| 2012/0237799 A1 | 9/2012 | Jiang et al. |
| 2012/0301750 A1 | 11/2012 | Reis et al. |
| 2013/0031318 A1 | 1/2013 | Chen et al. |
| 2013/0248165 A1 | 9/2013 | Kandasamy |
| 2013/0248615 A1 | 9/2013 | Yeates |
| 2013/0264875 A1 | 10/2013 | Kaminsky et al. |
| 2013/0266824 A1 | 10/2013 | Cowperthwaite et al. |
| 2013/0266826 A1 | 10/2013 | Cowperthwalte |
| 2014/0041179 A1 | 2/2014 | Bradley et al. |
| 2014/0136055 A1 | 5/2014 | Sugiyama et al. |
| 2015/0240939 A1 | 8/2015 | Ge |
| 2015/0246593 A1 | 9/2015 | Larson et al. |
| 2015/0300307 A1* | 10/2015 | Setterberg ............. H02J 7/1423 |
| | | 701/113 |
| 2016/0176298 A1 | 6/2016 | Watson et al. |
| 2016/0243960 A1 | 8/2016 | Wood et al. |
| 2016/0297317 A1 | 10/2016 | Huang et al. |
| 2016/0327007 A1 | 11/2016 | Averbukh et al. |
| 2017/0063104 A1 | 3/2017 | Bean |
| 2017/0129514 A1 | 5/2017 | Shubs, Jr. et al. |
| 2017/0194903 A1 | 7/2017 | Herbert |
| 2018/0013112 A1 | 1/2018 | Cameron |
| 2018/0198290 A1* | 7/2018 | Rohera ................. H02J 7/0014 |
| 2018/0249517 A1 | 8/2018 | Park et al. |
| 2019/0013692 A1 | 1/2019 | Dellevergini |
| 2019/0061555 A1 | 2/2019 | Liu et al. |
| 2019/0067754 A1 | 2/2019 | Gu et al. |
| 2019/0176650 A1* | 6/2019 | Wood ..................... B60L 50/40 |
| 2020/0052517 A1* | 2/2020 | Rosso .................... H02J 7/345 |
| 2020/0126735 A1 | 4/2020 | Johnson et al. |
| 2020/0127479 A1 | 4/2020 | Johnson et al. |

(56) References Cited

U.S. PATENT DOCUMENTS

2021/0012975 A1   1/2021  Su et al.
2021/0151809 A1   5/2021  Kong et al.
2021/0347225 A1  11/2021  Johnson et al.

OTHER PUBLICATIONS

Translation of CN 106100091 A; Published Nov. 9, 2016; 4 pages.
International Search Report and Written Opinion in related application No. PCT/US22/33062; Issued Oct. 6, 2022; 13 pages.

* cited by examiner

ON-BOARD STARTING MODULE FOR VEHICLE ENGINE

STATEMENT OF RELATED APPLICATIONS

This application is filed as a Continuation-in-Part of U.S. Ser. No. 17/832,619 filed Jun. 4, 2022. That application is entitled "On-Board Engine Starting Module for Vehicle Engine."

The '619 application claimed the benefit of U.S. Ser. No. 63/209,887 filed Jun. 11, 2021. That application is entitled "On-Board Engine Starting Module."

The '619 application also claimed the benefit of U.S. Ser. No. 63/300,687 filed Jan. 19, 2022. That application is also entitled "On-Board Engine Starting Module."

The '619 application was also filed as a Continuation-in-Part of U.S. Ser. No. 17/379,473 filed Jul. 19, 2021. That application is entitled "Hybrid Energy Power Module for Mobile Electrical Devices."

The '473 application was filed as a Continuation-in-Part of U.S. Ser. No. 16/352,555 filed Mar. 13, 2019. That application is entitled "Hybrid Super-Capacitor and Battery."

Each of these applications is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce selected aspects of the art, which may be associated with various embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of power generation for vehicles. More specifically, the present invention relates to an on-board starting module that may be activated to start a combustion engine when the battery in the vehicle is weak or has otherwise lost cranking power.

DISCUSSION OF TECHNOLOGY

Cars and trucks of various sizes sometimes suffer from an inability to start reliably. This may be because the starter has broken or the alternator has gone out. More commonly, it is because the battery has become too weak to store and discharge the electrical output necessary to start the engine.

All vehicles that are powered by an internal combustion engine rely on some version of a lead acid battery. Such batteries utilize two electrical terminals, referred to as "electrodes." The electrodes are separated by a chemical substance called an electrolyte. Electrical energy is released in response to a chemical reaction involving the electrodes and the electrolyte. Once the chemicals have been depleted, the reactions stop and the battery is no longer able to provide a charge to start the engine.

Depending on size, batteries can store large amounts of electrical energy. At the same time, lead acid batteries lose charge over time as the chemical reaction dissipates. This is particularly true when the battery is exposed to cold temperatures or sits idle for an extended period of time. In addition, lead acid batteries have a limited number of crank cycles, sometimes less than 1,000 cycles. This is a particular problem for delivery vehicles that make multiple curbside stops.

The operators of delivery vehicles prefer to allow their engines to idle. This saves battery life and expedites deliveries. However, some county and local regulations prevent idle times for delivery trucks in order to reduce carbon emissions. Indeed, many countries in Europe have regulations against engine idling for most all vehicles. In the case of delivery drivers, this makes it necessary for drivers to frequently re-start internal combustion engine vehicles during curbside stops. Of interest, this cycle of starting and stopping forces the battery to expend energy on lights, air fans, and other electrical components while the truck is stopped, further draining the battery. Compounding this problem, the drive time between deliveries is short so the battery may never get fully recharged by the alternator between stops.

For the reasons outlined above, all service trucks as well as tractor trailers suffer from the occasional inability to start reliably due to stress on the battery. This requires the vehicle to be towed, or requires a maintenance vehicle to be called out in an attempt to re-charge the battery on location.

Therefore, a need exists for a power module that resides on-board a delivery vehicle and that serves the function of a generator. A need further exists for such a power module that incorporates a bank of super capacitors to assist the battery in starting the engine. Further, a need exists for an on-board engine starting module that can crank the engine even when the battery is completely dead, and then be re-charged by the battery and alternator once a voltage level on the vehicle battery has been restored.

SUMMARY OF THE INVENTION

An engine starting module for a vehicle is provided herein. The vehicle may be a delivery vehicle such as a so-called city delivery truck. Alternatively, and by way of example, the vehicle may be a class-07 or class-08 over-the-road truck. Alternatively, the vehicle may be a large recreational boat such as a yacht or a so-called cabin cruiser. Alternatively still, the vehicle may be a commercial boat such as a ferry or fishing vessel.

In any instance, the engine starting module resides on-board the vehicle, or at least is configured to reside on-board the vehicle. The engine starting module provides energy for starting an engine associated with the vehicle in the event the battery on the vehicle is too weak to crank the engine. In the case of a large boat, the engine starting module may be called upon to start multiple outboard motors or a large in-board engine.

In one aspect, the engine starting module first comprises a housing. The housing is configured to reside on-board the vehicle, preferably proximate the vehicle battery. The housing enables the engine starting module to be moved onto the vehicle as an after-market product. Electrical connections may be made between the vehicle battery and the housing to install the engine starting module.

The starting module also includes a plurality of super capacitors. The plurality of super capacitors reside within the housing. The super capacitors are connected in series, and are configured to store electrical charge received from the electrical system of the vehicle. In one aspect, the plurality of super capacitors comprises six to twelve super capacitor cells, inclusive. Preferably, the plurality of super capacitors defines twelve super capacitor cells, with each super capacitor cell being paired with another super capacitor cell producing a series of six pairs, and with each pair having an electrical capacitance value of 6,000 Farads.

The plurality of super capacitors are electrically in parallel with the vehicle battery. In one aspect, the engine starting module further comprises a direct current (DC) converter. The DC converter also resides within the housing. The DC converter is in electrical communication with the battery of the vehicle, and is configured to transform DC voltage from the vehicle's electrical system to an appropriate DC voltage in order to charge (or re-charge) the plurality of super capacitors.

The engine starting module also includes control logic. The control logic controls the release (or discharge) of energy from the super capacitors to the battery. The control logic also controls the re-charging of the super capacitors once the vehicle engine is started and the alternator is turning (or "spinning").

The starting module also comprises an isolation switch. The isolation switch resides between the control logic and the plurality of super capacitors. In one embodiment, the isolation switch separates a ground of the battery from a ground of the super capacitors. The isolation switch is configured to move between open and close positions in response to signals from the control logic. In its default state, the isolation switch is open and physically separates the super capacitors from the vehicle battery. When closed, the isolation switch enables the super capacitors to send current to the vehicle battery.

In one embodiment, the isolation switch is a Field-Effect Transistor (or "FET"). The FET will have a gate that controls the flow of current into and out of the bank of super capacitors. In this instance, closing the isolation switch means turning on the gate. Reciprocally, opening the isolation switch means moving the gate to an off position.

In operation, when a condition of non-start is detected in the vehicle, the control logic closes the isolation switch and releases energy stored in the super capacitors into the vehicle battery. This is done for a designated time, which is a period of time sufficient to allow electronics in the vehicle to reset and to allow the vehicle battery to start the engine. In one aspect, the designated time is at least 10 seconds. Current is provided to the battery to raise the voltage within the battery to an operating threshold. The operating threshold is a condition upon which the battery is capable of turning over the engine.

In one embodiment, the engine starting module includes at least one voltage comparator. The voltage comparator is part of the control logic, and is configured to detect a voltage of the electrical system of the vehicle. The electrical system of the vehicle may include the battery, the alternator and the DC bus of the vehicle. In the parlance of the industry, the DC bus and the battery are sometimes referred to together as the vehicle bus, or the battery bus.

If the voltage of the vehicle battery is below a re-charge voltage threshold as detected by the voltage comparator, the control logic will send a signal that closes the isolation switch (or optionally, turns on the FET gate) to re-charge the vehicle battery (or battery bus). The isolation switch may be re-opened after a designated period of time. Alternatively, the isolation switch may be re-opened after the voltage level of the vehicle battery has reached its designated voltage level, or operating threshold.

In one aspect, closing the switch also starts an alternator associated with the vehicle. This may further charge the battery. More likely, closing the switch allows the battery to be re-charged to its operating threshold, which in turn allows the operator to crank the engine, which starts the alternator. In either instance, the plurality of super capacitors are re-charged by the vehicle's electrical system. In one embodiment, the control logic causes the super capacitors to be constantly charged by the alternator and/or the vehicle battery at 14.5 V. Constant charging by the alternator and/or vehicle battery continues for as long as the battery voltage is at least 9 V, or is at or above the operating threshold, or whatever voltage that threshold is.

In another embodiment, the plurality of super capacitors are isolated from the battery until it is detected that a voltage within the battery has dropped below a threshold needed to start the engine. The super capacitor cells are in parallel with the vehicle battery, but only when either charging or discharging. No DC/DC converter is used; instead, the alternator works in tandem with a four-way rectifier to serve as the DC converter. The super capacitors will connect in parallel to the battery while the alternator is running and only until they are charged (or re-charged). In this arrangement, the engine starting module uses the alternator output of the last engine start to charge the bank of super-capacitors. This is done automatically, that is, without operator intervention.

A method of starting an engine is also provided herein. In one aspect, the method first comprises providing a vehicle. The vehicle has one or more batteries and an internal combustion engine. The vehicle may be a delivery vehicle such as a so-called city delivery truck, or an over-the-road truck. Alternatively, the vehicle may be a boat such as a pleasure boat or a commercial boat. The battery is typically a lead acid battery used to supply power to crank the engine.

The method also includes providing a bank of super capacitors. The super capacitors reside on-board the vehicle, and within a housing. The housing is ideally designed as an after-market product that allows a vehicle operator to purchase the housing and then install it on the vehicle in such a manner that the electronics within the housing are in parallel with the vehicle battery.

The bank of super capacitors is in selective electrical communication with the battery by means of an isolation switch. The super capacitors may be in accordance with the super capacitors described above, in their various embodiments. As described above, a flow of current between the super capacitors and the battery is controlled, or modulated, by a control circuit.

The method also comprises operating the vehicle for a period of time. This means that the engine is turned on in connection with, or between, deliveries. There may be extended periods of non-start, or storage, between deliveries. Upon detecting that the vehicle is in a condition of non-start, the method includes closing the isolation switch. Non-start means that the battery does not have enough voltage to induce a rotation of the starter of the vehicle to crank the engine. Detection of this condition and closing of the isolation switch serves to release energy from the super capacitors to the battery. In this way, the battery is charged (or re-charged).

The method additionally includes starting the engine on the vehicle. It is noted that starting the engine will turn, or spin, the alternator. The housing and its bank of super capacitors, in essence, serve as an on-board generator for starting the engine and turning the alternator.

In one aspect, the method further comprises providing control logic for the bank of super capacitors. The control logic resides as part of the control circuit and controls a flow of current between the bank of super capacitors and the vehicle battery. The method then also includes monitoring a voltage of the battery.

In one embodiment, during a designated time, the control logic is configured to modulate discharge of the plurality of ultra-capacitors based on a comparison of the voltage level of the vehicle battery to a predetermined voltage threshold so as to raise the voltage level to at least the predetermined voltage threshold, or "operating threshold." If the operating threshold is reached during the designated time, the control logic is configured to open the isolation switch by sending an open signal. The operating voltage threshold may be, for example, 9 volts.

Optionally, the isolation switch is opened after the battery has reached its operating threshold and after the super capacitors have been re-charged. In one aspect, the control logic causes the super capacitors to be constantly charged by the alternator and/or the vehicle battery at 14.5 volts for as long as the battery voltage is at least 9 volts. In this instance, the isolation switch remains closed.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 1A:
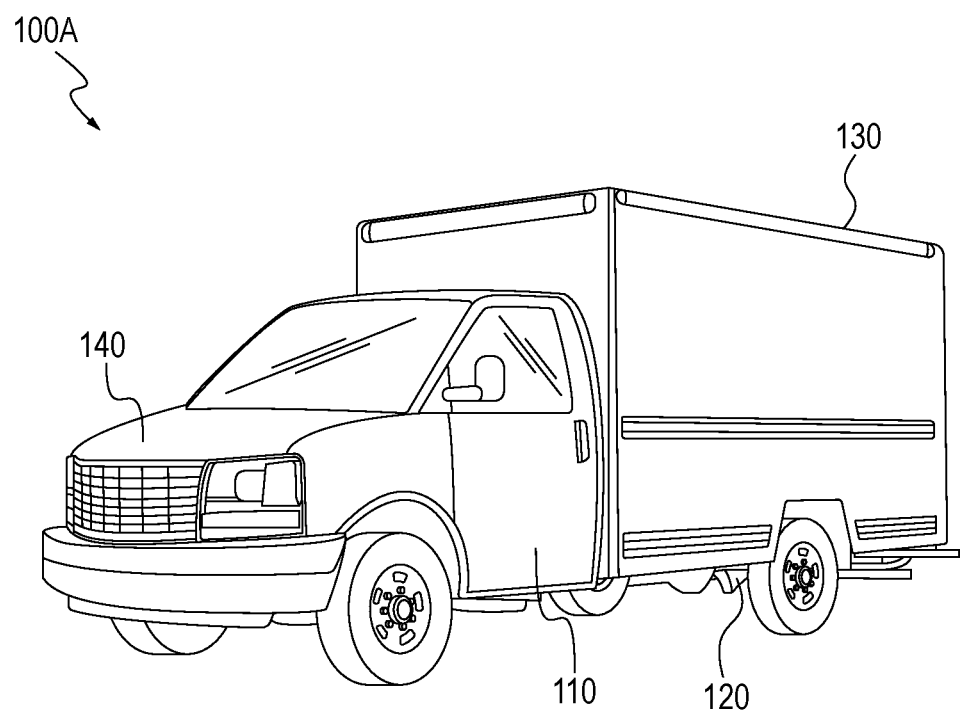
FIG. 1A is a perspective view of a delivery truck, in one embodiment. This particular truck is a so-called city delivery truck.

FIG. 1A is a perspective view of a delivery truck 100A. This particular truck 100A is a medium duty, multi-stop delivery truck. Such trucks are commonly used for local deliveries and can be driven without a commercial driver's license (CDL) in most states. This truck 100A is sometimes referred to as a city delivery truck.

Figure 1B:
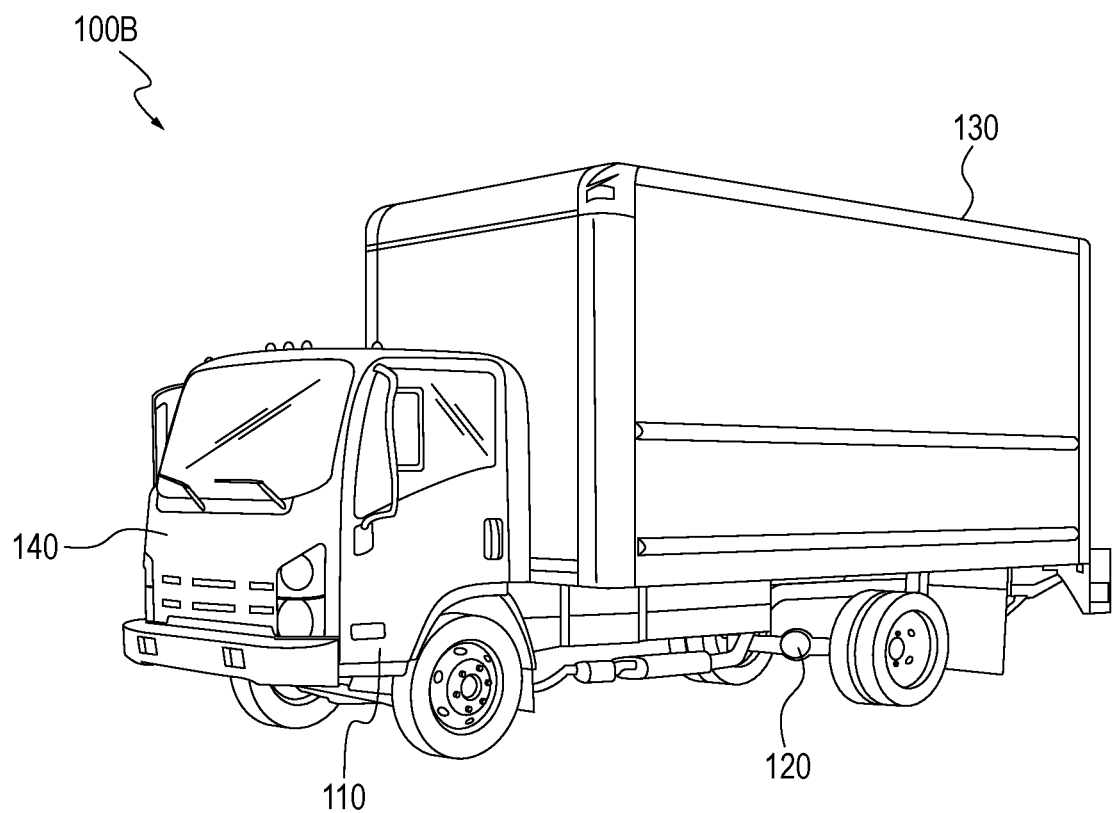
FIG. 1B is another perspective view of a delivery truck. This particular truck is a so-called light duty box truck.

FIG. 1B is another perspective view of a delivery truck 100B. This particular truck 100B is a so-called light duty box truck. Alternatively, this truck 100B may be referred to as a "hi-cube" truck. Such trucks are also frequently used for local deliveries and serve as city delivery trucks.

Figure 1C:
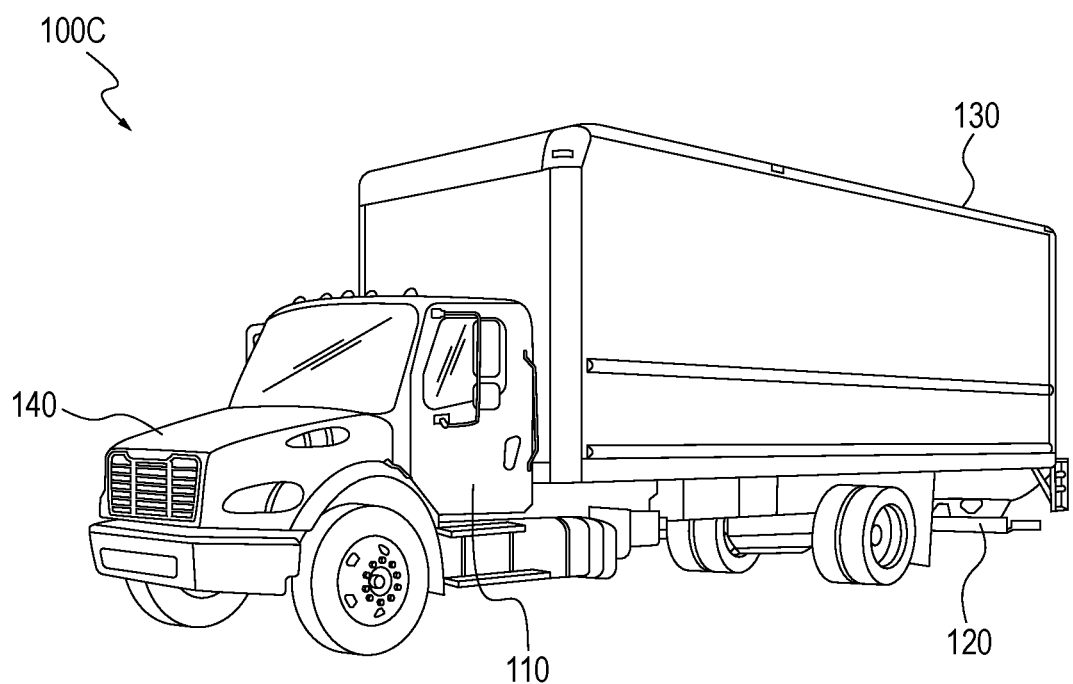
FIG. 1C is another perspective view of a delivery truck. This particular truck is a medium duty city delivery truck.

FIG. 1C is another perspective view of a delivery truck 100C. This particular truck 100C is a medium duty truck. Such trucks come in both CDL and non-CDL configurations and are used for the delivery of heavier items such as refrigerators and mechanical equipment.

Figure 1D:
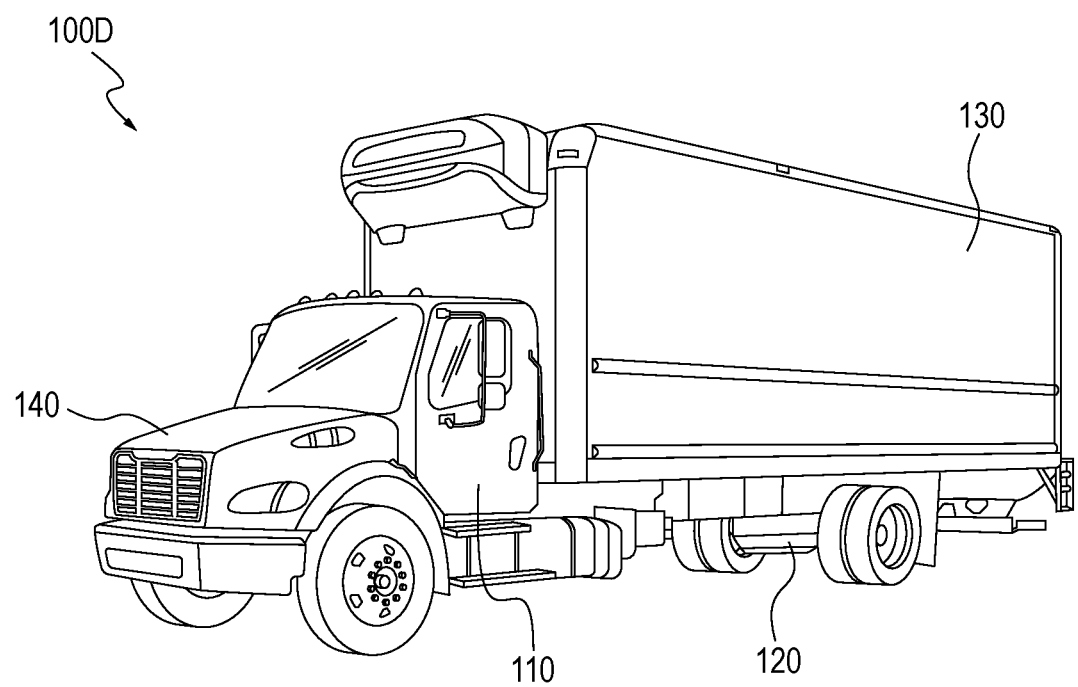
FIG. 1D is another perspective view of a delivery truck. This particular truck is a refrigerated truck.

FIG. 1D is another perspective view of a delivery truck 100D. This particular truck 100D is a refrigerated truck. This truck 100D is frequently used for local deliveries, such as to restaurants and grocery stores, and may also be considered a city delivery truck.

Figure 1E:
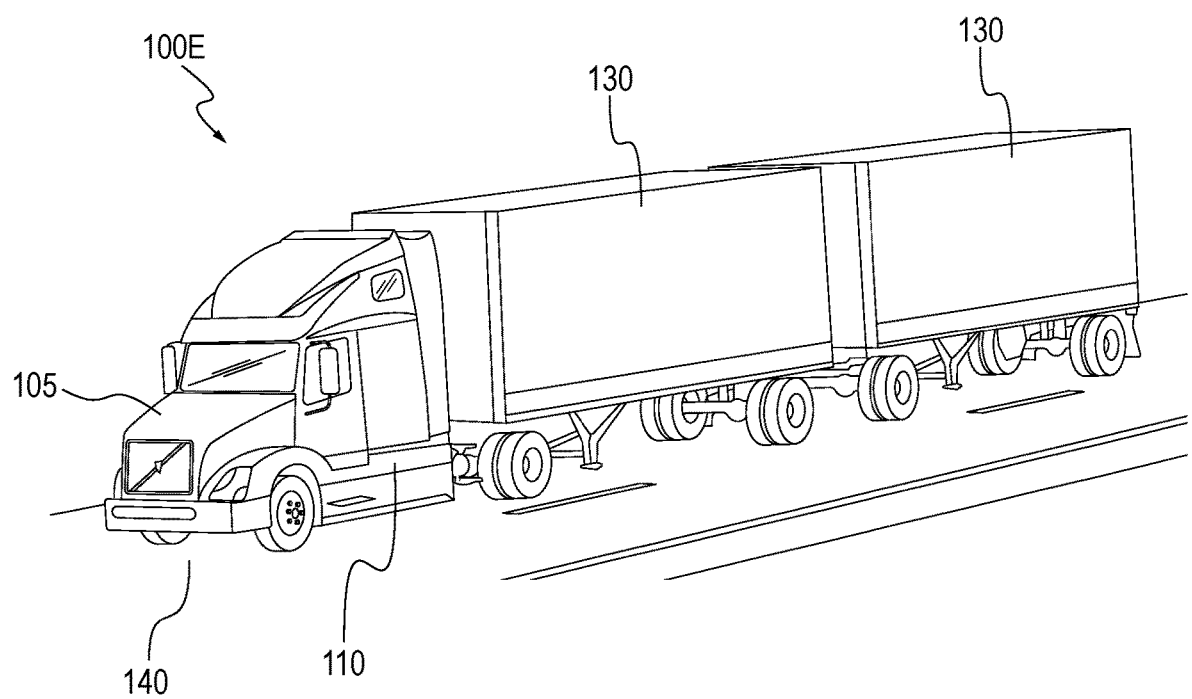
FIG. 1E is a perspective view of an over-the-road delivery truck. A tractor of the over-the-road truck is pulling two trailers in series.

FIG. 1E is a perspective view of an over-the-road delivery truck 100E. Here, a so-called tractor 105 is used to pull a separate trailer 130. In this instance, the tractor 105 is actually pulling two trailers 130, in series.

Each of trucks 100A, 100B, 100C, 100D and 100E is known and ubiquitously used in the transportation and shipping industries. Such trucks are available from Penske System, Inc. of Bloomfield Hills, Michigan and others. Each truck 100A, 100B, 100C, 100D, 100E includes a cab 110, a chassis 120 and a cargo compartment 130. In the case of trucks 100A, 100B, 100C and 100D, the cargo compartment 130 is mounted on the same chassis 120 as the cab 110. In the case of truck 100D, the cargo compartment 130 includes a refrigeration system. In the case of truck 100E, the cargo compartments 130 are part of separate trailers.

In each truck 100A, 100B, 100C, 100D, and 100E, the cargo compartment 130 is enclosed. In alternate embodiments, the cargo compartment 130 may be of an open or flatbed configuration. Each truck 100A, 100B, 100C, 100D, 100E, also includes an engine compartment 140. The engine compartment 140 holds the engine, an engine cooling system and a power system (not shown) for the vehicle. The power system will include at least one battery, an alternator, and a DC bus. The engine compartment will also hold an internal combustion engine.

Figure 2:
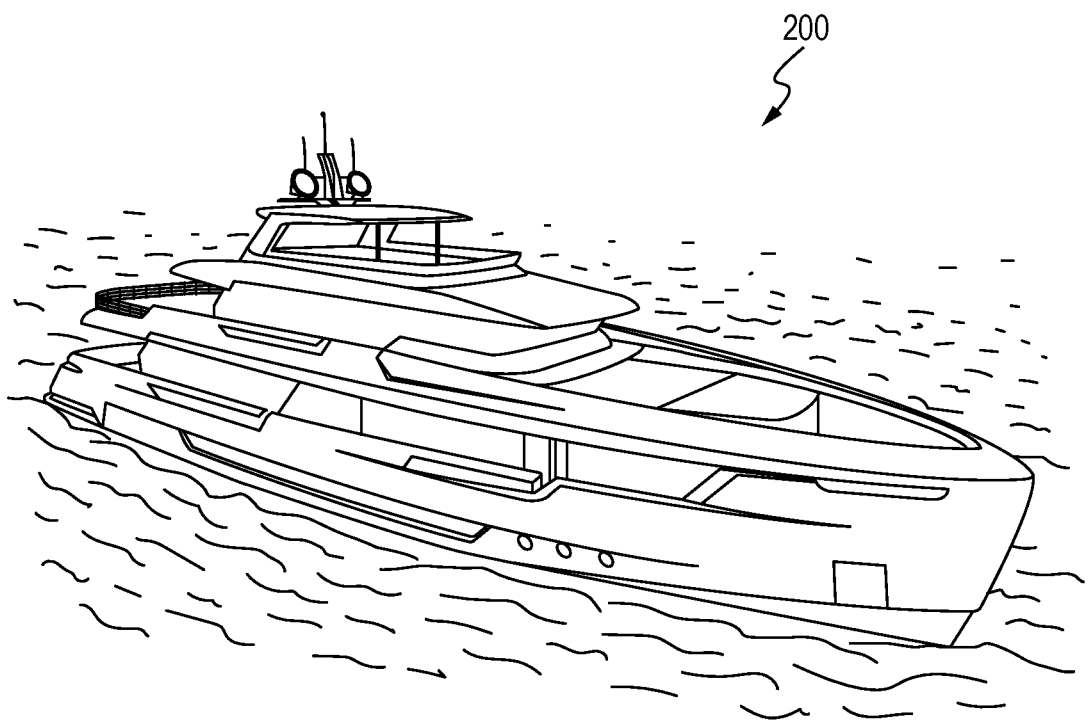
FIG. 2 is a perspective view of a yacht, which is an example of a vessel. The yacht has a large in-board motor for powering the vessel during transport.

FIG. 2 is a perspective view of a vessel 200. The illustrative vessel 200 may be representative of any pleasure vessel such as a cabin cruiser or large fishing boat. However, the specific vessel 200 shown in FIG. 2 is a yacht.

The yacht 200 will have a collection of batteries (not shown) that run a plurality of electrical systems on the vessel 200. In addition, the yacht 200 will have a large on-board motor for powering the vessel during transport. Ironically, many yachts, even smaller ones (which are still in excess of 60 feet in length), now come equipped with rear tender garages that hold one or two large jet skis. These jet skis will have their own engines that are used for power, and will have their own batteries that provide start power for a starter switch.

The vessel 200 of FIG. 2, is illustrative. Other vessels such as commercial fishing boats and ferries also use batteries. Such commercial vessels may have multiple outboard motors or, perhaps, a single large in-board engine.

The batteries associated with all of the vehicles 100A, 100B, 100C, 100D, 100E and 200 are susceptible to draining below an operational voltage level. Below this level, the battery cannot crank the engine (or, in the case of a vessel having multiple outboard motors, the engines).

Figure 3:
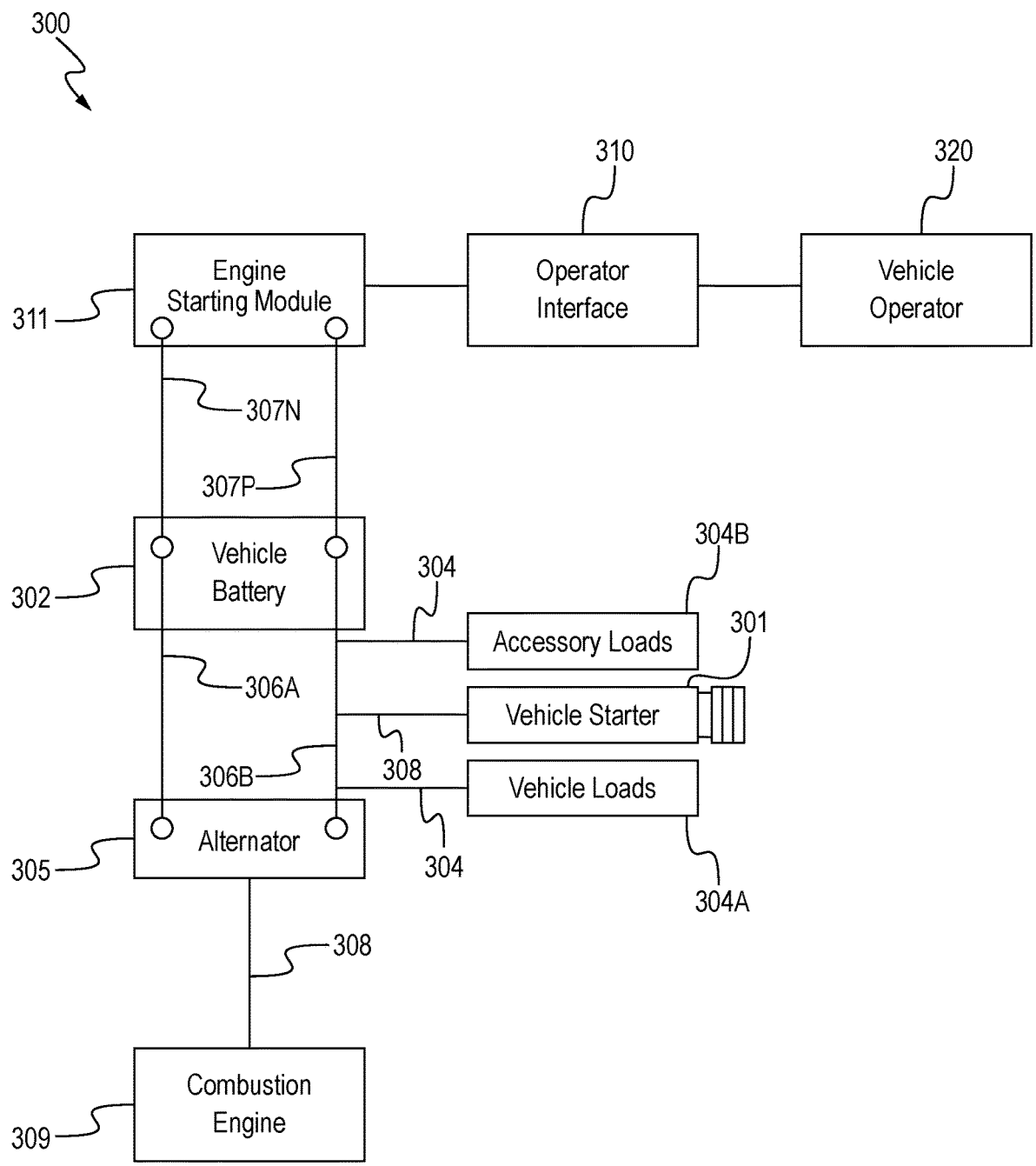
FIG. 3 is a diagram illustrating an electrical system for a vehicle. The vehicle has an internal combustion engine, along with a vehicle battery and an alternator. An on-board engine starting module is shown schematically, connected to the vehicle battery.

FIG. 3 is a diagram illustrating an electrical system for a vehicle 300. The vehicle 300 may be, for example, a car or a truck. The vehicle 300 may be a commercial vehicle such as a class-07 or class-08 semi-cab, or may be representative of a vessel such as a commercial boat or a pleasure boat. In any instance, the vehicle 300 includes a vehicle battery 302 and a vehicle alternator 305.

The vehicle battery 302 is a traditional lead acid battery. The battery 302 is in electrical communication with the vehicle alternator 305 by means of conductive cables 306. The conductive cables 306 may be a negative DC bus 306A and a positive DC bus 306B.

Cables 304 extend from the vehicle battery 302 as part of the DC bus or wiring harness. The cables 304 send electrical energy to support vehicle loads 304A and accessory loads 304B. The term "vehicle loads" 304A generally refers to a hotel load internal to the vehicle while "accessory loads" 304B generally refers to external loads that may be carried by the vehicle, such as lighting for the trailer or aftermarket parts.

The vehicle battery 302 sends a charge to a vehicle starter 301 in order to crank a combustion engine 309. Line 308 is illustrative of a DC bus used to convey electrical energy from the vehicle battery 302 to the starter 301. Thereafter, energy from the battery 302 and the alternator 305 support the vehicle loads 304A and accessory loads 304B.

In the illustrative arrangement of FIG. 3, the vehicle battery 302 is in electrical communication with an engine starting module 311. Engine starting module 311 represents a first of two embodiments of a starting module herein. Connection of the vehicle battery 302 to the starting module 311 is done by using positive 307P and negative 307N cables, collectively cables 307. Preferably, the engine starting module 311 resides on the vehicle 300 in proximity to the vehicle battery 302. In this way the cables 307 are short, e.g., less than 5 feet, in order to reduce so-called resistive line loss.

Figure 4:
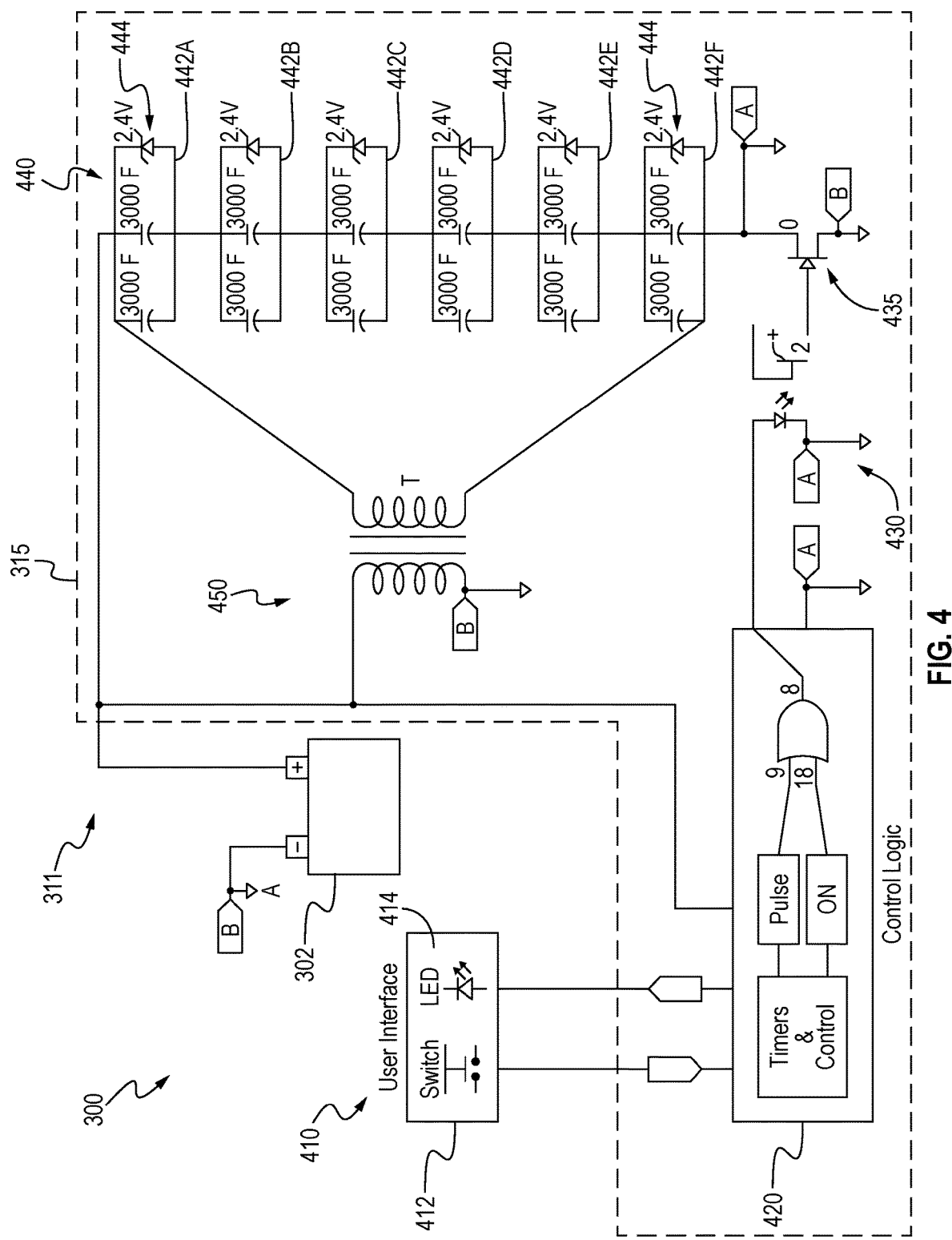
FIG. 4 is a circuit diagram showing the architecture of the engine starting module of FIG. 3, in a first embodiment.

The engine starting module 311 preferably resides within a housing (represented by box 315 in FIG. 4). The engine starting module 311 provides energy for starting the combustion engine 309 in the event the vehicle battery 302 on the vehicle (such as any tractor, city delivery truck, or boat) is too weak to crank the combustion engine 309. In this instance, the battery 302 voltage has fallen below an operating voltage threshold. The operating voltage threshold may be the minimum amount of energy needed to crank the combustion engine 309 and start the vehicle 300.

FIG. 4 is a diagram illustrating architecture for the vehicle 300 and the engine starting module 311. The vehicle battery 302 is shown in FIG. 4. The alternator 305 is not shown, but it is understood that it is present on the vehicle 300.

In the arrangement of FIG. 4, the engine starting module 311 includes a super capacitor 440. The super capacitor 440 resides within the housing 315, and is electrically in parallel with the vehicle battery 302.

The super capacitor 440 is preferably a series of individual super capacitors. In FIG. 4, six pairs of super capacitors 442A, . . . 442F are provided in series. A diode 444, such as a Zener diode, is placed across each pair of super capacitors 442A, . . . 442F, forming an active voltage clamp type balance circuit. Preferably, each super capacitor 442A, . . . 442F is a distinct cell that provides 2.4 volts DC charge.

The pairs of super capacitors 442A, . . . 442F are configured to store charge received from the electrical system of the vehicle 300. Preferably, the plurality of super capacitors 442A, . . . 442F defines twelve super capacitors, with each of six pairs of super capacitor having a value of 6,000 Farads. Of course, it is understood that more than six pairs of super capacitors may be used.

The engine starting module 311 also comprises a direct current (DC) converter 450 (also referred to as a DC/DC converter). The DC converter 450 resides within the housing 315. The DC converter 450 is in electrical communication with the vehicle battery 302 of the vehicle, and is configured to transform voltage from the vehicle's electrical system 400 in order to charge the plurality of super capacitors 442A, . . . 442F.

The DC converter 450 may include a switch that splits the super capacitors 442A, . . . 442F into two or more equal or unequal stacks, and buck charges the stacks (or steps down the voltage) in parallel. The DC converter 450 may transfer more power to the super capacitors 442A, . . . 442F if the alternator 305 is running, and less power if the vehicle battery 302 does not have enough energy to start the vehicle or is otherwise in a state of low voltage.

The DC converter 450 can be broken up into multiple phase angles, enabling lower peak currents, less electromagnetic interference (EMI), and/or smaller more efficient components. The multiple phases may be equally spaced on a 360° basis. For example, a 4-phase DC converter 450 splits the current into four equal parts that are 90° apart in the time spectrum. The DC converter 450 can control the current and/or voltage on the input side and the current and/or voltage on the output side. Current output control may allow the DC converter 450 to charge a completely empty bank of super capacitors 424 without excessive current (e.g., current that would normally collapse the converter 450).

The engine starting module 311 also includes control logic 420. The control logic 420 controls the discharge of energy from the super capacitors 442A, . . . 442F, and the re-charging of the super capacitors 442A, . . . 442F once the combustion engine 309 is started and the alternator 305 is spinning. In one aspect, the control logic 420 includes a pulse-width modulation (PWM) controller based on the vehicle battery 302 voltage. The control logic 420 may comprise at least one transistor in electrical communication with the plurality of super capacitors 440 to control current flow into and/or out of the plurality of super capacitors 440.

The engine starting module 311 also comprises an isolation switch 430. The isolation switch 430 resides between the control logic 420 and the plurality of super capacitors 442A, . . . 442F. In one embodiment, the isolation switch 430 separates a ground of the vehicle battery 302 from a ground of the super capacitors 442A, . . . 442F.

The isolation switch 430 is configured to move between open and close positions. Movement between these positions is in response to signals from the control logic 420. In its default state, the isolation switch 430 is open and separates (or isolates) the charge of the super capacitors 442A, . . . 442F from the vehicle battery 302. This is the position shown in FIG. 4. When closed, the isolation switch 430 enables the super capacitors 442A, . . . 442F to send current to the vehicle battery 302.

In operation, when a condition of non-start is detected in the vehicle, that is, the vehicle battery 302 does not have enough voltage to induce a rotation of the starter 301 of the vehicle 300 or, perhaps, is below a recharge voltage threshold, the control logic 420 closes the isolation switch 430 and releases energy stored in the super capacitors 442A, . . . 442F into the vehicle battery 302. The control logic 420 modulates the discharge of the super capacitors 442A, . . . 442F so as to raise the voltage level of the vehicle battery 302. This may be done by controlling current flow through at least one transistor in electrical communication with the super capacitors 442A, . . . 442F.

The transfer of energy from the ultra-capacitor 440 may be done for a designated time, which is a period of time sufficient to allow electronics in the vehicle 300 to reset and to allow the vehicle battery 302 to start the vehicle 300. In one aspect, this is a two-step process, where the electronics are first reset, followed by a re-charging of the vehicle battery 302. The designated time may be, for example, between 10 and 20 seconds.

In one embodiment, the engine starting module 311 includes at least one voltage comparator. The voltage comparator is part of the control logic 420, and is configured to detect a voltage of the electrical system of the vehicle 300. The electrical system includes the vehicle battery 302, the alternator 305 and the DC bus of the vehicle 300. This voltage will be balanced when the combustion engine 309 is running. If the voltage of the vehicle battery 302 is below a predetermined recharge voltage threshold as detected by the voltage comparator, the control logic 420 will send a signal that closes the isolation switch 430 to re-charge the vehicle battery 302 at least to an operating voltage threshold and to start the alternator 305.

The control logic 420 may send an open signal to open the isolation switch 430. This may be done after a designated time or after the vehicle battery 302 has been recharged to the recharge voltage threshold. Alternatively, and more preferably, the plurality of super capacitors 442A, . . . 442F are re-charged by the vehicle's electrical system after the designated time. In this instance, the isolation switch 430 is maintained in a closed position. In one aspect, the control logic 420 causes the super capacitors 442A, . . . 442F to be constantly charged by the alternator 305 and/or the vehicle battery 302 at 14.5 V for as long as the battery voltage is at least 9 V. The isolation switch 430 may then be closed when the engine 309 is shut off.

In one embodiment, during the designated time, the control logic 420 is configured to modulate the discharge of the plurality of super capacitor cells 442A, . . . 442F based on a comparison of the voltage level of the battery 302 to a predetermined voltage threshold so as to raise the voltage level to at least the predetermined voltage threshold. If the predetermined voltage threshold is reached during the designated time, the control logic 420 opens the isolation switch 430 by sending an open signal. The predetermined voltage threshold may be, for example, 9 V. The pre-determined voltage threshold should be higher than the minimum voltage operating threshold of the battery 302.

In a preferred embodiment, the control logic 420 causes the super capacitors 442A, . . . 442F to be constantly charged by the alternator 305 and/or the vehicle battery 302 for as long as the battery voltage is at or above the predetermined voltage threshold. Using a series totaling 1,000 Farads (6,000±6), the super capacitors 442A, . . . 442F are charged to 14.5 V. They will remain constantly charged when the system voltage is above the predetermined voltage threshold. Charging is done using an isolated DC converter 450 at a constant wattage technique so as not to over drain the battery 302.

In one aspect of the embodiments herein, the vehicle includes a user interface. This is shown at 410 of FIG. 4. The user interface is a control panel 410 is operated by a vehicle operator. The control panel 410 may include an indicator light (not shown), indicating the status of the super capacitors 442A, . . . 442F, e.g., UC power level. The control panel 410 may also include an energy start button 412. The control panel 410 may also include an LED or other light indicator. The control logic 420 is in electrical communication with the control panel 410 within the vehicle (such as vehicle 100C).

The energy start button 412 is configured to be pressed by the operator in response to the operator detecting that the battery 302 is weak, i.e., does not possess the electrical charge necessary to start the combustion engine 309. In this instance, the operator's activation of the system by pressing the energy start button 412 sends a signal to the control logic 420 to close the isolation switch 430. The isolation switch 430 is closed for the designated time in response to receiving the re-charge signal. This may be referred to as a manual mode.

During the manual mode, a comparator performs a comparison of the voltage level of the vehicle battery 302 to a predetermined voltage threshold. The control logic 420 modulates discharges of the super capacitors 440 based on the comparison so as to raise the voltage level to at least the recharge voltage threshold. Preferably, and as noted, the voltage level is raised to a level that is greater than the minimum operating voltage threshold.

In one aspect, when the vehicle operator detects an obvious non-start due to a dead electrical system, the vehicle operator presses the engine start button 412 on the control panel 410. An indication light will flash for a period of time, such as five seconds. During this time, a minimal amount of energy is 'pulsed' from the super capacitors 442A, . . . 442F over to the vehicle bus. This enables the vehicle's electronics to be completely reset and running prior to transferring the full amount of energy. This is particularly beneficial for newer vehicles.

During the five seconds (or other period of time), the operator will visually see the instrument cluster on the control panel 410 come alive. The engine starting module 311 may transfer approximately 250 watts during the five seconds, enabling the reset. This is approximately 1,250 Joules, leaving a remainder of over 100.00 Joules for the start. After five seconds, the light 414 will turn solid and the remaining energy from the super capacitors 442A, . . . 442F is transferred. The super capacitors 442A, . . . 442F will remain in parallel with the battery 302, enabling maximum power transfer.

Components of the engine starting module 311 may be solid state. As understood in the art of electronics, solid-state components, including field-effect transistors (FETs) and insulated gate bipolar transistors (IGBT), tend to be faster, more dependable, and consume less power than relays and contactors. In the arrangement of FIG. 4, a Field-Effect Transistor 435 is shown between the capacitor 440 and the isolation switch 430. The engine starting module 311 may include one or more enhancement mode n-channel field-effect transistors (N-FETS), which can be used in parallel to reduce the Equivalent Series Resistance (ESR) of the delivery of the energy from the capacitor bank 440 or even in a split mode recharging scheme. In some embodiments, the total quiescent current of the electronics may be less than 50 mA so that excess drain of the vehicle battery 302 does not occur over extended periods of time.

The housing 315 of the engine starting module 311 goes in parallel to the vehicle's battery 302. The housing 315 and its capacitor bank 440 can come in different capacitance sizes depending on the amount of energy that would be needed for a typical start for the subject vehicle. In one aspect, the engine starting module 311 is available in both 12 volt DC and 24 volt DC sizes, depending on the size of the vehicle 300 and the type of combustion engine 309 In one aspect, the engine starting module 311 is offered as an after-market product that may be installed onto a vehicle in the engine compartment 140.

During operation, the engine starting module 311 sits quietly and fully charged in the vehicle 300. When conditions of a non-start (or at least battery weakness) are detected, either by the operator or automatically by the control logic 420 and its voltage comparator, energy is discharged into the vehicle's battery 302 for up to the designated time, typically 10 to 20 seconds. This allows sufficient time for the electronics, e.g., vehicle loads 304A, in the vehicle to reset. A start is then possible.

The engine starting module 311 can be packaged to have only two terminal connections to the outside world and can be connected to the engine 309 just like a battery 302 is connected to the engine 309. The control logic 420 can be co-located on a single printed circuit board assembly (PCBA) within the housing 315 for simplicity and lower cost.

Figure 5:
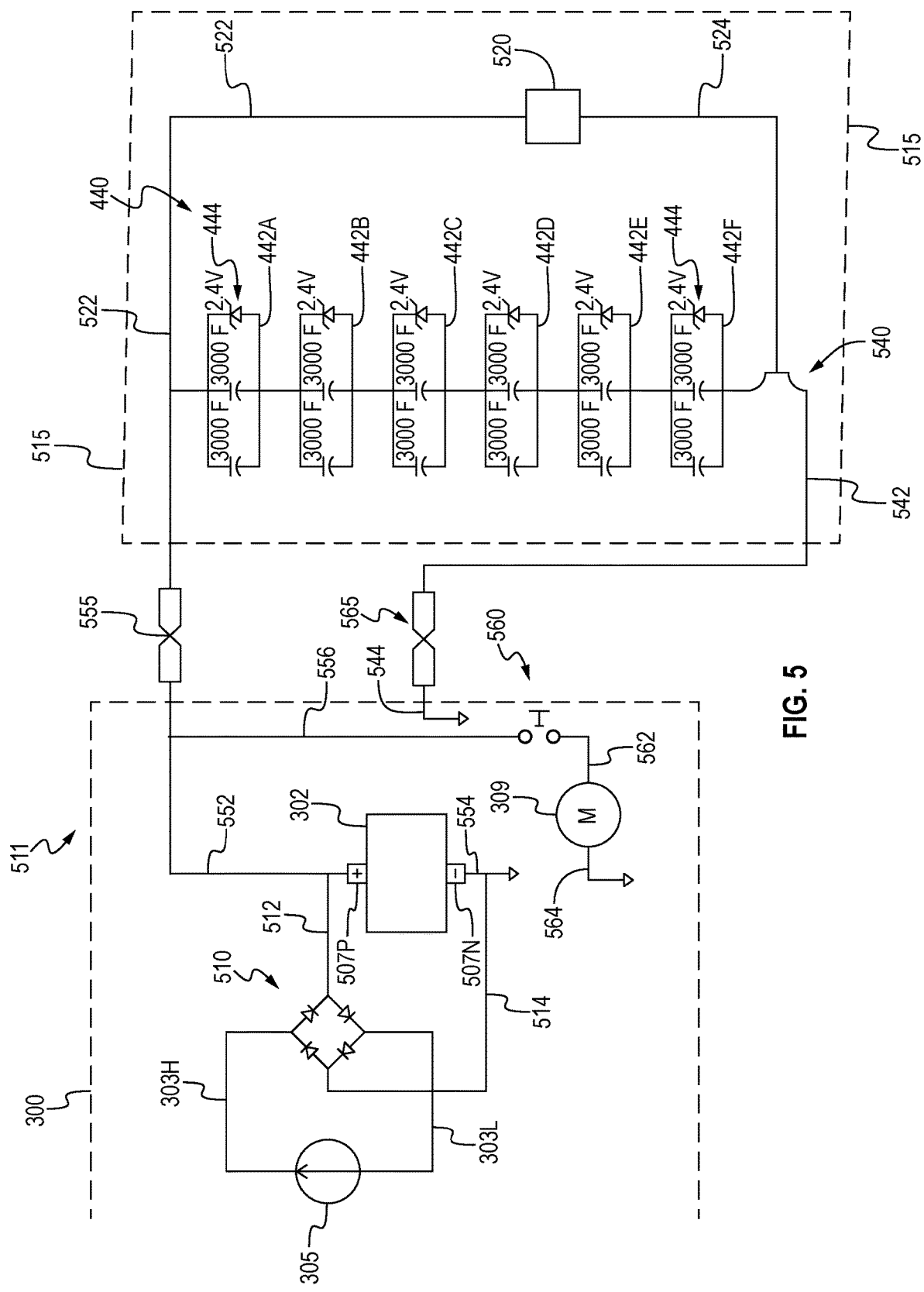
FIG. 5 is a circuit diagram showing the architecture of the engine starting module of FIG. 3, in a second embodiment. The engine starting module is again shown connected to a vehicle battery.

FIG. 5 is a circuit diagram showing the architecture of an engine starting module 511, related to the engine start module 311 of FIG. 3, in its second embodiment. The engine starting module 511 is associated with vehicle 300, indicated schematically.

As with the first engine starting module 311, the second engine starting module 511 is connected electrically to the vehicle battery 302. However, in this arrangement the connection is made using a single positive cable 552. The positive cable 552 is connected to a positive terminal 507P of the battery 302. Negative cable 554 is connected to a negative terminal 507N and goes to ground.

Only one battery 302 is shown in FIG. 5. However, it is understood that multiple batteries, each with its own positive and negative terminals, may be used in order to increase an available power to the combustion engine 309 or to be compatible with an electrical system of a certain vehicle. It is also understood that multiple engines 309 may be used, such as in the case of a vessel 200 having two or more outboard or inboard motors.

Positive cable 552 is also in electrical communication with the vehicle relay 560. The vehicle relay 560 may be a starter switch that is activated by the operator of the vehicle 300. This may be done by pushing a button or by turning an ignition key. When the vehicle relay 560 is closed, electrical energy is provided from the battery to start the combustion engine 309.

The engine starting module 511 is connected to the electrical system of the vehicle 300 by means of two connectors 555, 565. Connector 555 connects line 552 extending from the battery 302 to line 522 that extends to control logic 520 within the engine starting module 511. Connector 565 extends from an isolation switch 540 to a ground wire 544 within the vehicle 300. Preferably, the engine starting module 511 resides on the vehicle 300 in proximity to the vehicle battery 302.

With the engine starting module 511, a housing 515 is provided. The housing 515, similar to that of housing 315 of FIG. 3, holds a super capacitor 440. The super capacitor 440 may be a grouping of four to twelve super capacitor cells residing in series. Alternatively, and as shown in FIG. 5, the super capacitors 440 may represent pairs of super capacitors 442A, . . . 442F placed in series. A diode 444, such as a Zener diode, is placed across each pair of super capacitor 442A, . . . 442F, forming an active voltage clamp type balance circuit. Preferably, each super capacitor 442A, . . . 442F provides 2.4 volts DC charge.

In one aspect, the plurality of super capacitors 442A, . . . 442F defines six pairs of super capacitors, with each pair of super capacitors having a capacitance of 6,000 Farads. Of course, it is understood that more than six pairs of super capacitors may be used. In the arrangement of FIG. 5, the super capacitors 442A, . . . 442F are in parallel with the battery 302, but only when the super capacitors 442A, . . . 442F are charging or discharging. The super capacitors 442A, . . . 442F will connect in parallel to the vehicle battery 302 while the alternator 305 is running and until they are charged (or re-charged). In one aspect, control logic 520 will limit re-charging to approximately 14.5V. At that point, the switch function of the control logic 520 will disconnect automatically.

It is observed that the second engine starting module 511 does not utilize the DC converter 450 of FIG. 4. Instead, the vehicle alternator 305 itself essentially serves as the DC converter. Two wires exit the alternator 305, those being a high side wire 303H and a low side wire 303L. Each of wires 303H and 303L is polarity neutral.

The two wires 303H and 303L are connected to a rectifier 510. The rectifier 510 is in the form of a four-way bridge. The rectifier 510 provides polarity to the electrical power generated by the alternator 305. Wire 512 exits the alternator 305 as a positive wire, while wire 514 exits the alternator 305 as a negative wire. Positive wire 512 ties into the positive terminal 507P of the battery 302. Negative wire 514 connects to the negative terminal 507N. Using the alternator 305 in conjunction with the rectifier 510 as the DC converter is a less expensive option that providing the DC/DC converter 450 of FIG. 4.

As noted, positive wire 552 is connected to wire 522 of the engine starting module 511. Control logic 520 monitors current passing through the wire 522 associated with the battery 302. The control logic 520 prevents the flow of current through wire 522, separating the ultra-capacitor 440 from the battery 302. When the engine 309 is running and the alternator 305 is on, the voltage of the battery 302 should be between 13.0 and 14.5 volts.

As described in detail above, there are multiple scenarios where battery voltage and current draw may drop below a threshold required to crank the engine 309. For example, the battery 302 may be weak due to a period of inactivity combined with exposure to cold temperatures. When the vehicle operator tries to start the vehicle 300, current is drawn down. If the control logic 420 detects significant low battery voltage, that is, the battery voltage has dropped below a designated operating voltage threshold along with a negative dV/dt, the control logic 420 will close, and send a signal to close the isolation switch 540. This reconnects the ultra-capacitor 440 back in parallel to the vehicle battery 302.

The isolation switch 540 is preferably a field-effect transistor ("FET"). The FET acts as a gate, and resides between the control logic 520 and the super capacitor cells 442A, . . . 442F. As understood by those of ordinary skill in the art, an FET is a type of transistor that uses an electric field to control the flow of current in a semiconductor. In the application of FIG. 5, the FET 540 controls current output and voltage from the bank of ultra-capacitors 440 when the battery 302 voltage is low. Reciprocally, the FET 540 controls current input and voltage into the bank of ultra-capacitors 440 when the alternator 305 is running, allowing the super capacitor cells 442A, . . . 442F to re-charge.

In one aspect of operation, when the alternator 305 hits 14.0 V, a timer associated with the control logic 520 will start. The control logic 520 will keep the FET gate 540 on, allowing charging of the super capacitor cells 442A, . . . 442F for a period of 3 seconds. Current travels from the battery 302, through positive wire 552, through connection 555, through wire 522, through the control logic 520, through the FET gate 540, and to the super capacitor cells 442A, . . . 442F. The super capacitor 440 should then be charged to about 14.5 Volts.

Reciprocally, when the control logic 520 detects there is less than 10 V on the battery 302 along with a significant increase in current draw dV/dt, the FET 540 is turned on, the control logic 520 closes, and current travels from the super capacitor cells 442A, . . . 442F, through the FET gate 540, through the control logic 520, through wire 522, through connection 555, through positive wire 552, and into the battery 302. This may be done based on a timer, or based on the control logic 520 sensing that battery 302 voltage has reached about 14.5 Volts. Either way, this back-and-forth cycle will operate over and over again, and will continue automatic operation without any vehicle operator required interference.

Beneficially, the circuit draws little to no load from the ultra-capacitor 440 (typically about 0.0001 μAmps while the battery 302 is disconnected). Assuming all other loads such as cell balancing are set higher than a level at which the super capacitor cells 442A, . . . 442F are charged, the super capacitor cells 442A, . . . 442F will maintain their charge down to about 12 Volts (in series) for about six months. Stated another way, the super capacitor cells 442A, . . . 442F will remain charged for up to six months with enough stored energy to initiate an engine start.

Of interest, the engine starting module 511 does not require a separate DC/DC converter. Instead, the engine starting module 511 uses the alternator 305 output of the last engine start to charge the bank of ultra-capacitors 442.

There are multiple advantages to the engine starting modules 311, 511 described herein. For example, the modules 311, 511 offer a wide operating temperature range, such as −30 to +65° C. The modules 311, 511 are compatible with computerized vehicle systems as they pre-charge the electronics, enabling the electronics (including vehicle loads 304A) to be reset appropriately prior to a full transfer of power from the respective super capacitor cells 442.

The engine starting modules 311, 511 each eliminate the worry of starting the truck or other large equipment. Indeed, each of the modules 311, 511 enables starting the vehicle or other large equipment even where the battery 302 is completely dead. In one aspect, enough power is stored within the ultra-capacitor bank 440 to enable two attempts at starting within an interval of 15 minutes, for a total of over 105,000 Joules of stored energy.

The electrical systems of FIGS. 4 and 5 do not modulate (or "push") power to the vehicle bus; rather, the electrical systems of FIGS. 4 and 5 only assist in starting the engine once the need is detected. In other words, modules 311 and 511 serve as built-in jump start modules. The engine starting modules 311, 511 are capable of transferring energy into the vehicle electrical system at an efficiency of greater than 99%. The engine starting modules 311, 511 are fully integrated and sealed, and are self-balancing for long life and are light in weight.

In view of the engine starting modules described above, a method of providing electrical energy to a vehicle is also provided herein. Providing electrical energy means providing power to reset electronics and/or to start an engine.

Figure 6A:
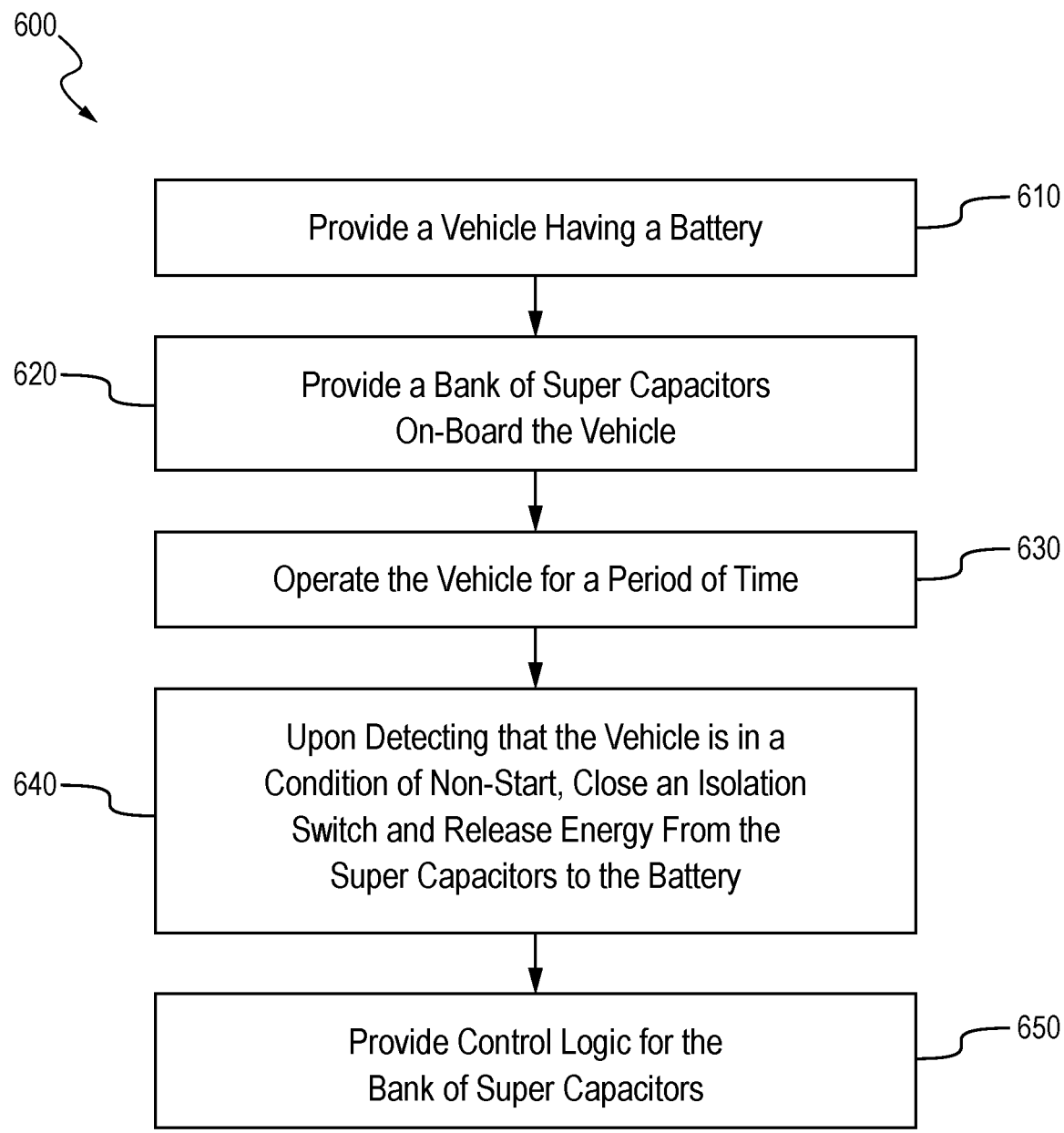
FIGS. 6A and 6B present a single flow chart showing steps for starting an engine of a vehicle, in one embodiment. This is done by using one of the engine starting modules of the present invention.
Figure 6B:
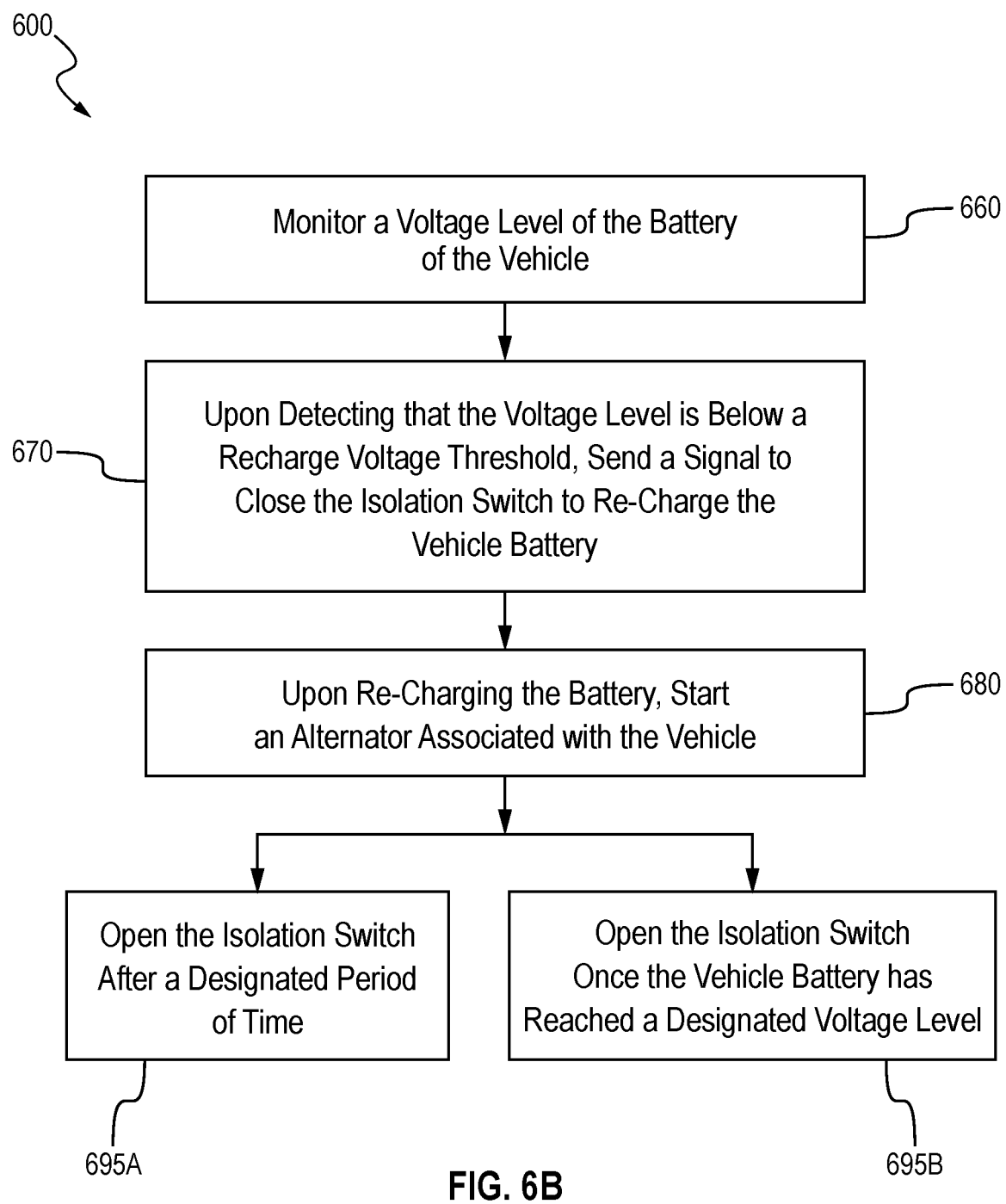

FIGS. 6A and 6B, together, present a single flow chart showing steps for a method 600 for starting an engine, in one embodiment.

The method 600 first includes providing a vehicle having a battery. This is shown at Box 610. The vehicle may be any land or ocean-going vessel that operates off of one or more internal combustion engines. Examples include any of the trucks presented in FIGS. 1A through 1E and the yacht presented in FIG. 2.

The battery is preferably a traditional lead acid battery. The step of Box 610 may include providing two or more batteries in series that provide charge for vehicle electronics and the engine.

The method 600 next includes providing a bank of super capacitors. This is seen in Box 620. The bank of super capacitors may be in accordance with the capacitor bank 440 shown in either of FIG. 4 or 5. The capacitor bank 440 comprises a bank of individual super capacitor cells 442 that reside on-board the vehicle and within the housing 315, 515.

The method 600 also comprises operating the vehicle for a period of time. This is shown in Box 630. It is understood that operating the vehicle need not be continuous operation, but may be intermittent operation, meaning that multiple vehicle stops occur, or even that the vehicle sits idle for a period of time between starts (or attempts at starting).

The method 600 then includes detecting that the vehicle is in a condition of non-start or that the battery is otherwise significantly weakened. Stated another way, a voltage of the vehicle battery has dropped below an operating threshold. This is indicated at Box 640. When this condition is detected, an isolation switch associated with the bank of super capacitors closes. The isolation switch is shown at 430 in FIG. 4.

As part of the step of Box 640, a vehicle operator may press a start button associated with a user interface. This sends a signal that causes the isolation switch to close. When the isolation switch closes, energy is discharged from the bank of super capacitors to the vehicle battery. This has the effect of recharging the battery. Stated another way, the voltage level of the vehicle battery is increased.

The method 600 may additionally comprise providing control logic for the bank of super capacitors. This is provided at Box 650. The control logic resides in a control circuit and controls a flow of current between the bank of super capacitors and the vehicle battery. In one embodiment, the control logic comprises a circuit that modulates a flow of current. In another embodiment, the control logic comprises a comparator, which may be firmware or software.

The method 600 also includes monitoring a voltage level of the battery of the vehicle. This is shown at Box 660 of FIG. 6B.

Upon detecting that the voltage level of the vehicle battery is below a recharge voltage threshold, the method 600 includes sending a signal to close the isolation switch. This is an automatic step seen at Box 670. This allows the bank of super capacitors to re-charge the vehicle battery. Note that the step of Box 670 may operate in the same way as the step of Box 640.

In one aspect, once the vehicle battery is re-charged, an alternator associated with the vehicle is started. This is done by operation of the engine associated with the vehicle. This step is provided at Box 680.

In one embodiment of the method 600, the isolation switch remains closed for a designated period of time. The designated period of time is a pre-set time believed to re-charge the vehicle battery. This is provided by programming a timer, which in turn may be a part of the control circuit. The designated period of time may be, for example, between ten seconds and twenty seconds, or even up to one minute, depending on the size of the battery and the number of super capacitors employed in the bank of super capacitors. Thereafter, the isolation switch is re-opened. This is shown at Box 695A.

In another embodiment of the method 600, the isolation switch remains closed until the vehicle battery has reached a designated voltage level, referred to as an operating threshold. This is seen at Box 695B.

In the step of Box 695B, the control logic is configured to modulate discharge of a plurality of super capacitors based on a comparison of the voltage level of the vehicle battery to the operating threshold so as to raise the voltage level. Optionally, a timer may be used to re-open the isolation switch after a designated period of time if the operating threshold is not reached. In this embodiment, the timer may be a part of the control circuit. Otherwise, control logic opens the switch when the re-charge threshold voltage level is reached.

Optionally, and in connection with use of the engine starting module 311, the isolation switch remains closed while the vehicle is operated. In this way, the super capacitors are constantly charged by the alternator and/or the vehicle battery for as long as the battery voltage is above the operating threshold, such as 9 V. In one aspect, the re-charge time for the bank of super capacitors 440 is about 15 minutes. Of interest, the control logic draws its power from the bank of super capacitors 440.

In connection with the use of engine starting module 511, the isolation switch will be the control logic 520 in combination with the FET 540. In this instance, closing the isolation switch refers to turning the FET off. Similarly, opening the isolation switch refers to turning the FET on.

In another aspect, the isolation switch will close once the super capacitors 440 have been re-charged. Current flows from the vehicle battery 302 and the alternator 305 through the isolated DC Converter 450. A constant wattage technique is preferred so as not to over drain the vehicle battery 302.

As can be seen, a novel engine starting module is provided. It will be appreciated that the inventions are susceptible to modification, variation and change without departing from the spirit thereof. For example, the engine starting modules 311 and 511 have been described herein in the context of starting a combustion engine for a land-based cars or trucks. However, the invention has equal application to starting combustion engines associated with Gen-Sets, boats, RV's, ATV's, motorcycles, jet skis, and other consumer and commercial applications that utilize a combustion engine.

What is claimed is:

1. An engine starting module for a vehicle, the vehicle having an engine, an alternator configured to generate electrical power, and at least one vehicle battery, and the engine starting module comprising:
    a rectifier in electrical communication with the alternator, the rectifier being configured to provide polarity to the electrical power of the alternator when the alternator is running, and the rectifier residing in series between the alternator and the battery;
    a housing configured to reside on-board the vehicle;
    a plurality of super capacitors connected in series within the housing, the super capacitors being configured to store charge;
    a wire capable of being connected to the at least one vehicle battery;
    control logic configured to monitor voltage within the at least one vehicle battery;
    an isolation switch movable between open and close positions in response to signals from the control logic such that when the isolation switch is in its open position the isolation switch separates the charge of the super capacitors from the at least one vehicle battery, but when the isolation switch is in its close position, the isolation switch enables the super capacitors to send current through the isolation switch, through the wire and to the at least one vehicle battery;
    and wherein:
        the control logic moves the isolation switch between its open position and its close position to control the transfer of energy between the plurality of super capacitors and the at least one vehicle battery,
        the control logic permits current to (i) move from the battery, through the wire, through the isolation switch, and to the plurality of super capacitors to re-charge the plurality of super capacitors when the alternator is running without converting voltage, and (ii) from the plurality of super capacitors, through the isolation switch, through the wire, and to the battery without modulation to re-charge the battery up to an operating voltage threshold so that the at least one vehicle battery is able to start the vehicle engine, all without operator intervention; and
        the control logic further maintains the isolation switch in its close position while the alternator is running to re-charge the super capacitors to the same potential as the vehicle battery.

2. The engine starting module of claim 1, wherein:
    the plurality of super capacitors comprises 6 to 12 super capacitors; and
    the housing resides in an engine compartment of the vehicle.

3. The engine starting module of claim 1, wherein:
    the plurality of super capacitors comprises 6 to 12 pairs of super capacitors;
    each of the pairs of super capacitors has a capacitance of 6,000 Farads; and
    each of the plurality of super capacitors has an output of 2.4 V DC.

4. The engine starting module of claim 1, wherein:
    the rectifier is a four-way bridge;
    the alternator is connected directly to the housing without intermediate circuitry; and
    the isolation switch resides between the control logic and the plurality of super capacitors.

5. The engine starting module of claim 4, wherein:
    the isolation switch is a Field-Effect Transistor ("FET") having a gate; and
    moving the isolation switch to its closed position comprises moving the gate to an on position.

6. The engine starting module of claim 5, wherein;
    the control logic is further configured to monitor the flow of electrical current passing through the wire; and
    when a condition of non-start is detected in the vehicle due to a low battery voltage, the control logic is configured to move the isolation switch into its on position, thereby connecting the plurality of super capacitors in parallel to the vehicle battery, and release energy stored in the super capacitors through the wire and into the at least one vehicle battery.

7. The engine starting module of claim 1, wherein energy is discharged from the plurality of super capacitors in a first stage that resets electronics in the vehicle, and a second stage which occurs after the first stage that re-charges the at least one vehicle battery up to the operating voltage threshold.

8. The engine starting module of claim 1, wherein the control logic causes the plurality of super capacitors to be charged by the alternator and/or the at least one vehicle battery up to 14.5 V.

9. The engine starting module of claim 8, wherein:
the operating voltage threshold is at least 9 volts; and
the control logic is configured to move the isolation switch to its close position and to cause the super capacitors to be constantly charged by the alternator at 14.5 volts for as long as the battery voltage is at least 9 volts.

10. The engine starting module of claim 4, wherein the vehicle is a city delivery truck, or an over-the-road truck pulling at least one trailer.

11. The engine starting module of claim 1, wherein:
the plurality of super capacitors are arranged in pairs; and
a Zener diode clamp is placed across each pair of super capacitors, forming an active voltage balance circuit.

12. A method of starting an engine, comprising:
providing a vehicle having an alternator, a battery and a combustion engine;
providing a rectifier in electrical communication with the alternator, the rectifier being configured to provide polarity to electrical power of the alternator, and the rectifier residing in series between the alternator and the battery;
providing a bank of super capacitors on-board the vehicle, with the bank of super capacitors being in selective electrical communication with the battery by means of an isolation switch;
operating the vehicle for a period of time;
using control logic, monitoring a voltage level of the battery;
upon detecting that the vehicle is in a condition of non-start due to a low voltage level of the battery, closing the isolation switch to discharge energy in the form of electrical current from the bank of super capacitors to the battery without modulation of the electrical current;
maintaining the isolation switch in a closed state for a sufficient time to allow the super capacitors to dump voltage to the battery so that the voltage level of the battery has reached an operating voltage threshold;
using the battery, starting the engine automatically and running the alternator; and
further maintaining the isolation switch in its closed state until the alternator has run for a sufficient period of time to re-charge the bank of super capacitors to the same potential as the battery without converting the voltage; and wherein the control logic, the isolation switch and the bank of super capacitors all reside within a housing, with the housing serving as an engine starting module and residing on-board the vehicle.

13. The method of claim 12, wherein: the bank of super capacitors is connected in series within the housing, the super capacitors being configured to store charge; the isolation switch resides between the control logic and the bank of super capacitors; the battery and the bank of super capacitors are placed in electrical communication by means of a first wire extending from the battery and a second wire connected to the bank of super capacitors and extending from the housing; and the method further comprises electrically connecting the first wire and the second wire.

14. The method of claim 12, wherein: the rectifier is a four-way bridge; the isolation switch is a Field-Effect Transistor ("FET") having a gate; moving the isolation switch to its closed position comprises turning on the gate; the control logic permits the electrical current to move from the battery, through the first wire, through the second wire, through the FET, and to the bank of super capacitors to re-charge the bank of super capacitors when the alternator is running.

15. The method of claim 14, wherein:
the FET is movable between off and on positions such that when the FET is in its off position the gate separates a charge of the bank of super capacitors from the battery, but when the gate is in its on position the FET enables the bank of super capacitors to send the flow of electrical current to the battery; and
the control logic moves the gate between its off position and its on position to control the transfer of energy between the bank of super capacitors and the battery through the wire automatically and without operator intervention.

16. The method of claim 15, wherein when a condition of non-start is detected in the vehicle due to a low battery voltage, the control logic moves the FET into its on position and discharges energy stored in the super capacitors through the FET, through the second wire, through the first wire, and into the battery.

17. The method of claim 15, wherein energy is discharged from the bank of super capacitors in a first stage that resets electronics in the vehicle, and a second stage after the first stage that re-charges the battery.

18. The method of claim 15, wherein: the vehicle is a city delivery truck; the bank of super capacitors reside within an engine compartment of the vehicle; the super capacitors of the bank of super capacitors are connected in series within the housing; and the super capacitors of the bank of super capacitors reside in parallel with the battery.

* * * * *